Patented Aug. 24, 1943

2,327,767

UNITED STATES PATENT OFFICE 2,327,767

SALT COMPOSITION

Francis Stapleton Chambers, Jr., Woodbury, N. J., assignor to E. I. du Pont de Nemours & Company, Wilmington, Del., a corporation of Delaware No Drawing. Application September 26, 1940, Serial No. 358,419

10 Claims. (Cl. 23—104)

This invention pertains to a sodium nitrite composition having improved properties, particularly with respect to caking or setting, and a method of producing said improved composition.

Sodium nitrite of high parity is employed extensively in the production of various commodities, as well as in numerous industrial processes. Thus, large quantities of such sodium nitrite are used for the curing of meats and in the manufacting of many dyes. Usually the material is produced by absorbing oxides of nitrogen in an alkaline solution or suspension while controlling the oxidation of the oxides of nitrogen to that state most conducive to the formation of a salt of high purity, following which the sodium nitrite is crystallized from solution.

Although a sodium nitrite salt which satisfies the requisites with respect to purity is produced, the handling of the product is rendered difficult by the fact that it tends to cake or set upon standing under the usual atmospheric conditions. This property of sodium nitrite is a serious disadvantage because of the fact that relatively large quantities of the material are involved in those processes in which it finds application. Moreover, the caking or setting of the sodium nitrite cannot be eliminated or inhibited by the addition of well-known anti-setting agents because the various uses of the salt prohibit the presence of the agents commonly employed for this purpose.

The object of the present invention is a sodium nitrite composition of improved properties with respect to caking or setting, which is suitable for use in the production of the various commodities and in the industrial processes in which sodium nitrite is currently employed. Another object is a method of producing a sodium nitrite of enhanced anti-setting properties, which does not necessitate the introduction of undesirable impurities. A further object is a sodium nitrite composition which possesses improved resistance with respect to caking or setting, and a method of making the same. Other objects will become apparent as the invention is described more in detail hereinafter.

I have found that the foregoing objects are attained by coating the crystals of sodium nitrite with a finely divided alkali metal carbonate, or mixtures thereof. The term "alkali metal carbonates" refers to the carbonates of sodium and potassium, and this term is used in this sense throughout the specification. Surprisingly, when crystals of sodium nitrite are provided with a thin coating of sodium carbonate or potassium carbonate, or a mixture thereof, in finely-divided condition, the resulting composition exhibits remarkably improved resistance with respect to caking or setting, as compared to the setting and caking properties of the sodium nitrite crystals in the absence of such coating. Moreover, it is not essential that the finely divided coating agent be present in large quantities. Instead, very minute quantities of these materials may be employed, so that the resultant composition complies with standards set forth for sodium nitrite in the U. S. Pharmacopoeia.

The coating of the sodium nitrite crystals is effected by intimately intermingling crystals of this material with the finely-divided coating material, so that a protective layer or coating is formed on the sodium nitrite crystals. As stated hereinbefore, the effect produced by the addition of an alkali metal salt or mixtures thereof is very apparent, even though very minute quantities of such material be employed. Thus the addition of $\frac{1}{4}$ of 1% of these alkali metal carbonates causes a material improvement in the resistance of the sodium nitrite with respect to caking under atmospheric conditions of storage. The addition of increased amounts of the coating agent increases further the resistance of the sodium nitrite to caking. However, I prefer to employ not more than 4%, since quantities within this range are sufficient to inhibit caking and setting when the sodium nitrite is subjected to what may be deemed normal conditions of storage, and at the same time does not result in a sodium nitrite composition of low purity. The effect of the addition of sodium carbonate to sodium nitrite crystals is indicated in the following example, which is cited as a specific embodiment, and of course is not intended as limiting the present invention.

Various portions of granular sodium nitrite gave the following screen analysis:

*Example I*

| | Per cent |
|---|---|
| On 35-mesh | 4 |
| 35-65-mesh | 48 |
| 65+ mesh | 48 |

This granular sodium nitrite was the standard commercial product which, as is well known, being prepared by any standard commercial process now employed, contains no compounds capable of reacting with sodium carbonate to form water insoluble carbonates. These were treated with 0.2%, 0.5%, and 1% of sodium carbonate, at least 70% of the sodium carbonate passing through a 200-mesh screen. In each instance, the sodium nitrite and the sodium carbonate were intermingled thoroughly by agitating the mixtures in a barrel of the type employed for glazing smokeless powder, said agitation being continued for a period of 1 hour. At the end of this time, the samples were packed into steel containers, which were then stored under atmospheric conditions for a period of 10 weeks. Several drums containing similar quantities of untreated sodium nitrite were stored under the same conditions in order that they might serve as a basis of comparison. Examination of the samples was made at various intervals during the storage period. In general, the caking or setting of the material appeared to increase as the time of storage increased. However, at the end of the 10 weeks, the sodium nitrite containing 1% of sodium carbonate was granular and free flowing and exhibited only a very slight tendency to form into lumps which crumbled very readily. The material containing 0.5% of sodium carbonate showed a somewhat greater tendency to cake, with the formation of lumps of material. In general, it was classified as satisfactory, since the lumps could be broken readily by hand, whereas the material containing 0.2% of sodium carbonate was characterized by numerous lumps which could be broken up rather readily, but could not be classified as strictly free-flowing material. The standard of comparison, that is the sodium nitrite which was not coated with any material, was very lumpy and contained practically no material which was not caked. These lumps could be broken up only with great difficulty, since they were very hard, and in general such material would be inconvenient to handle.

Anti-setting material of widely varying degrees of fineness may be suitably employed in conjunction with the sodium nitrite. However, the efficacy of the setting inhibitor increases if this material is in a state of subdivision wherein the particles are smaller in size than the crystals of sodium nitrite with which it is employed. Thus, if the sodium nitrite crystals are of such fineness that the bulk of them pass a 50-mesh screen, the anti-setting agents preferably should be of such fineness that all will pass through a 100 mesh screen. Moreover, because of the fact that the coating may be applied to the sodium nitrite more readily if the coating agent is in finely-divided form, it is preferred to use a material having particles of very small size, such as those which will pass through a 200-mesh standard screen.

The intermingling of the coating agent with the sodium nitrite may be effected according to any known procedures. Thus, any of the well-known devices for tumbling or agitation of solids may be employed. It is essential only that intermingling of the materials be such that coating of substantially all of the sodium nitrite crystals will result.

The use of sodium carbonate or potassium carbonate for preventing the caking of sodium nitrite does not introduce ingredients which are undesirable from the standpoint of the intended use of the sodium nitrite. Thus, small quantities of these inhibitors do not interfere with the diazotization reactions characterizing the manufacture of dyes, nor do they prohibit the use of the resultant sodium nitrite composition for the curing of meats. In this respect, they are particularly advantageous when compared with well-known anti-setting agents such as talc, zinc oxide, and the like, because sodium nitrite containing these latter materials would not be satisfactory for many of the uses to which this material is now put. Moreover, due to the fact that the present setting inhibitors need be employed only in very small quantities, it is possible to obtain a sodium nitrite composition of high purity which does not cake to form hard lumps when it is stored under atmospheric conditions of storage. The advantage of a free-flowing material or one which can be broken up readily is believed apparent.

Various modifications may be made from the foregoing description without departing from the spirit or scope of the invention. It is intended, therefore, to be limited only in accordance with the following patent claims.

I claim:

1. A sodium nitrite composition of enhanced resistance to caking, said composition comprising dry sodium nitrite granules coated with a relatively small proportion of a finely divided alkali metal carbonate, said nitrite granules being free from compounds capable of reacting with the carbonate coating to form water insoluble carbonates.

2. The sodium nitrite of claim 1, wherein the alkali metal carbonate is sodium carbonate.

3. The sodium nitrite of claim 1, wherein the alkali metal carbonate is potassium carbonate.

4. A sodium nitrite composition of enhanced resistance to caking, said composition comprising dry sodium nitrite granules coated with not more than 4% by weight of a finely-divided alkali metal carbonate, said nitrite granules being free from compounds capable of reacting with the carbonate coating to form water insoluble carbonates.

5. A method of inhibiting the caking of granular sodium nitrite, which comprises coating the grains of dry sodium nitrite with a finely-divided alkali metal carbonate, said nitrite grains being free from compounds capable of reacting with the carbonate coating to form water insoluble carbonates.

6. A method of inhibiting the caking of granular sodium nitrite which comprises coating the granules of dry nitrite completely by intermingling said granules intimately with a relatively small proportion of a finely divided alkali carbonate, said nitrite granules being free from compounds capable of reacting with the sodium carbonate coating to form water insoluble carbonates.

7. A method of inhibiting the caking of granular sodium nitrite, which comprises coating the granules of dry sodium nitrite with a relatively small proportion of a finely-divided alkali metal carbonate, said carbonate being composed of particles which are smaller than the granules of sodium nitrite, said nitrite granules being free from compounds capable of reacting with the carbonate coating to form water insoluble carbonates.

8. A method of inhibiting the caking of granular sodium nitrite, which comprises coating the granules of dry sodium nitrite with an alkali metal carbonate, said carbonate being in such finely-divided state that substantially all of the particles thereof pass through a 100-mesh screen, said nitrite granules being free from compounds capable of reacting with the carbonate coating to form water insoluble carbonates.

9. A sodium nitrite composition of enhanced resistance to caking, said composition comprising dry sodium nitrite granules coated with not more than 4% by weight of a finely-divided alkali metal carbonate, said alkali metal carbonate being composed of particles which are smaller than the sodium nitrite granules, said nitrite granules being free from compounds capable of reacting with the carbonate coating to form water insoluble carbonates.

10. A sodium nitrite composition of enhanced resistance to caking, said composition comprising dry sodium nitrite granules intimately intermingled with a relatively small proportion of an alkali metal carbonate to form a complete coating of carbonate on the granules of nitrite, the particles of said alkali metal carbonate being of a much lower order of magnitude than the granules of sodium nitrite, said nitrite granules being free from compounds capable of reacting with said carbonate coating to form water insoluble carbonates.

FRANCIS STAPLETON CHAMBERS, Jr.